US012766511B2

(12) United States Patent
Yang et al.

(10) Patent No.: US 12,766,511 B2
(45) Date of Patent: Oct. 20, 2026

(54) MAGNETIC SORTING MICROFLUIDIC CHIP AND MANUFACTURING METHOD THEREFOR

(71) Applicant: SHENZHEN INSTITUTES OF ADVANCED TECHNOLOGY CHINESE ACADEMY OF SCIENCES, Shenzhen (CN)

(72) Inventors: Hui Yang, Shenzhen (CN); Lin Zeng, Shenzhen (CN)

(73) Assignee: SHENZHEN INSTITUTES OF ADVANCED TECHNOLOGY CHINESE ACADEMY OF SCIENCES, Shenzhen (CN)

( * ) Notice: Subject to any disclaimer, the term of this patent is extended or adjusted under 35 U.S.C. 154(b) by 1051 days.

(21) Appl. No.: 17/883,289

(22) Filed: Aug. 8, 2022

(65) Prior Publication Data

US 2022/0379312 A1 Dec. 1, 2022

Related U.S. Application Data

(63) Continuation of application No. PCT/CN2020/116866, filed on Sep. 22, 2020.

(51) Int. Cl.
*B01L 3/00* (2006.01)
*B33Y 80/00* (2015.01)

(52) U.S. Cl.
CPC ... *B01L 3/502761* (2013.01); *B01L 3/502707* (2013.01); *B33Y 80/00* (2014.12);
(Continued)

(58) Field of Classification Search
None
See application file for complete search history.

(56) References Cited

U.S. PATENT DOCUMENTS

2004/0018611 A1* 1/2004 Ward ................ B01L 3/502761 435/287.2
2012/0080360 A1* 4/2012 Stone ........................ B03C 1/01 210/695

FOREIGN PATENT DOCUMENTS

CN 101842161 A 9/2010
CN 209451870 U * 10/2019
(Continued)

OTHER PUBLICATIONS

N. M. Dempsey, "Micro-magnetic imprinting of high field gradient magnetic flux sources", Appl. Phys. Lett. 104, 262401 (2014). (Year: 2014).*
(Continued)

*Primary Examiner* — Neil N Turk
*Assistant Examiner* — Benjamin Joseph Kass

(57) ABSTRACT

The present invention provides a magnetic sorting microfluidic chip, including a substrate, a chip model material layer, a micro-channel unit and a magnetic sorting unit, where the chip model material layer is disposed on the substrate, and the micro-channel unit and the magnetic sorting unit are both disposed in the chip model material layer; the micro-channel unit includes a sorting channel and magnetic pole channels; the sorting channel is provided with a plurality of sorting channel inlets and a plurality of sorting channel outlets; and the magnetic sorting unit includes permanent magnets, high-permeability alloys, and magnetic pole arrays disposed in the magnetic pole channels, where the high-permeability alloys are configured to conduct magnetic fields of the permanent magnets to the magnetic pole arrays, so that the magnetic pole arrays generate magnetic fields having opposite polarities on left and right positions of the sorting channel.

4 Claims, 4 Drawing Sheets

(52) U.S. Cl.
CPC ... *B01L 2200/0652* (2013.01); *B01L 2200/12* (2013.01); *B01L 2300/0864* (2013.01)

(56) References Cited

FOREIGN PATENT DOCUMENTS

| | | | | | |
|---|---|---|---|---|---|
| CN | 110964636 | A | | 4/2020 | |
| EP | 2864051 | B1 | * | 9/2020 | ............. B03C 1/288 |
| WO | 2010117458 | A1 | | 10/2010 | |

OTHER PUBLICATIONS

International Search Report of PCT/CN2020/116866.
Written Opinion of PCT/CN2020/116866.

* cited by examiner

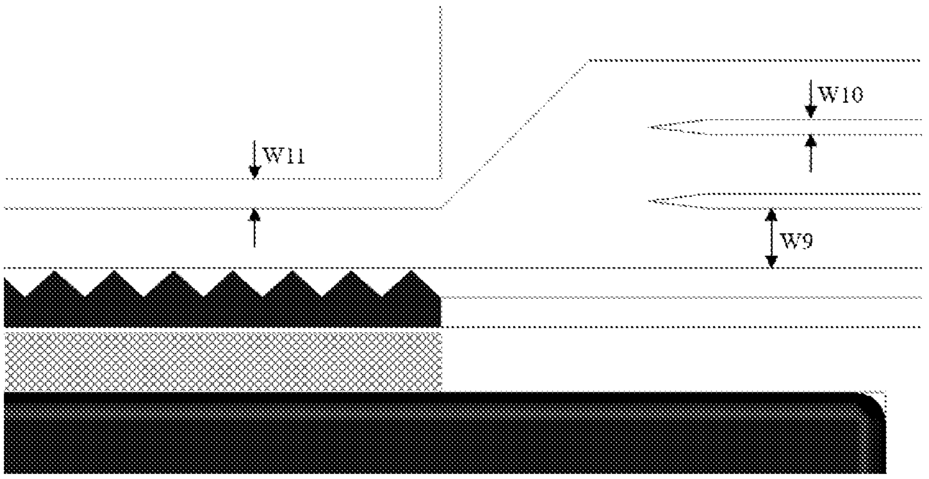

FIG. 5

201 Manufacturing a microfluidic chip by using an MEMS process and a soft lithography method or by means of printing by a 3D printer 202 Embedding a third high-permeability alloy in a third region, and fixing a third permanent magnet above the third high-permeability alloy 203 Injecting a solution, obtained by uniformly mixing ferromagnetic powder and pure water, into two magnetic pole channels through two magnetic pole channel inlets, so as to preliminarily secure the ferromagnetic powder in a preset magnetic pole array region under effects of the third high-permeability alloy, the third permanent magnet and filtration column structures in the magnetic pole channels 204 Injecting liquid polydimethylsiloxane (PDMS) into the two magnetic pole channels through the two magnetic pole channel inlets, enabling the liquid PDMS to pass through the micro-channel filtration column structures, respectively embedding a first high-permeability alloy and a second high-permeability alloy into a first region and a second region, and then curing the liquid PDMS, so that the ferromagnetic powder is completely secured on the preset magnetic pole array region 205 Removing the third high-permeability alloy and the third permanent magnet from the microfluidic chip, then fixing a first permanent magnet above the first high-permeability alloy, and fixing a second permanent magnet above the second high-permeability alloy

FIG. 6

MAGNETIC SORTING MICROFLUIDIC CHIP AND MANUFACTURING METHOD THEREFOR

CROSS-REFERENCE TO RELATED APPLICATION

This application is a bypass continuation application of PCT application No.: PCT/CN2020/116866. This application claims priority from PCT Application PCT/CN2020/116866, filed Sep. 22, 2020, the contents of which is incorporated herein in the entirety by reference.

TECHNICAL FIELD

The present disclosure relates to the technical field of magnetic sorting microfluidic chips, and particularly to a magnetic sorting microfluidic chip and a manufacturing method therefor.

BACKGROUND

Separation and purification of samples such as cells, bacteria and particles are key steps in manufacture of biochemical samples. Sorting biochemical samples of a particular size from complex samples, or separating biochemical samples of multiple different sizes or types can both provide a guarantee for the accuracy in subsequent detection and analysis. In recent years, biological samples of a submicron scale, for example, extracellular vesicles (30-1000 nm), have become more and more significant in scientific research. Therefore, the scale of biological sample sorting objects urgently needs to be developed from a micron scale to a nanometer scale.

At present, sorting methods for micron cells or particles are relatively mature, but due to a scale effect, applying these methods to sorting of nano particles cannot result in a good effect, or even does not work. On this basis, after various methods are improved, some nano particle sorting and purification methods are developed. However, some of these methods may damage biological samples, for example, an optical method may generate joule heat, a surface potential in a dielectrophoresis method may damage cells, and an ultrasonic method is likewise no suitable for biological sample sorting due to its limits in resolution and throughput. For separation and purification of submicron biological samples, there are some mature conventional methods, mainly including, taking separation and purification of extracellular vesicles as an example, ultracentrifugation methods, density gradient centrifugation methods, ultrafiltration methods and size exclusion chromatography methods. However, these methods all have certain limitations. For example, instruments required in the ultracentrifugation method and the density gradient centrifugation method are expensive, the processing time is long and the methods require a large amount of samples. The ultrafiltration method is vulnerable to blockage, which results in low separation efficiency. The size exclusion chromatography method is limited by the quantity of loaded samples and the number of use of chromatographic columns. Therefore, it is urgent to develop a new method to overcome these defects, thereby achieving the purpose of efficiently separating and purifying submicron biological samples such as extracellular vesicles. In recent years, microfluidic chip-based extracellular vesicle separation and purification gradually become a research hotspot. The microfluidic technology provides relatively simple, low-cost and continuous separation methods, where due to a significant medium effect of micro-nano magnetic beads, microfluidic magnetic sorting combined with magnetic bead immunoassay is currently most studied. Compared with other methods, magnetic sorting has characteristics such as no damage to biological samples, a flexible and controllable magnetic field, a relatively simple system, low cost and high throughput, and magnetic beads, as a magnetic medium, have been widely applied in sorting and capture of micron cells. Therefore, magnetic sorting has a great potential in processing of nano biological samples.

Magnetic sorting can be divided into labeled sorting and label-free sorting in processing of biological samples, corresponding to positive magnetophoresis sorting (or magnetophoresis sorting for short) and negative magnetophoresis sorting. The labeled sorting generally includes labelling biological samples by magnetic beads, and then operating the magnetic beads by a magnetophoretic force generated by an external field to implement separation from a complete sample system, thereby achieving sorting of particular biological samples. The advantage of magnetic labelling is that the magnetic beads can be precisely operated and controlled by an external magnetic field. At present, operation and control of nano magnetic beads are already realized, and the magnetic beads can be immunologically bound to particular cells after being subjected to surface modification, so that specific capture is realized. The disadvantages are that it is relatively difficult to remove the magnetic beads after binding to cells, and when different cell samples have the same surface marker, the magnetic beads may be specifically bound to all of these cell samples, and the purity of samples is affected. There are two label-free sorting methods. One uses paramagnetism or diamagnetism of cells and implements separation by means of an external magnetic field. However, this method relies on characteristics of cells and the application is limited. The other method is performing negative magnetophoresis separation on cells in a paramagnetic salt solution or ferromagnetic solution in combination with an external high-gradient magnetic field. The method has a simple structure and is easy to implement, but currently it basically focuses on sorting of micron cells or particles, and the resolution in terms of size needs to be improved.

Most of existing label-free magnetic sorting technologies (negative magnetophoresis sorting) adopt permanent magnets to directly provide a magnetic sorting force, and the defect is that the permanent magnet cannot get close to samples to be sorted. In a magnetic sorting microfluidic chip, the distance between the permanent magnet to the sorting channel is always greater than or equal to 500 microns. However, in a region closer to the permanent magnet, the magnetic field intensity and the magnetic field gradient will be greater, and thus a magnetic force acting on particle samples is also greater (the magnetic force is proportional to the magnetic field intensity, the magnetic field gradient, the particle volume and the magnetic susceptibility difference between particles and the surrounding solution). Due to the limitation of this distance, the resolution of negative magnetophoresis sorting currently only stays at a cellular level (≥3.5 microns), and the resolution of a sorting size difference is greater than or equal to 5 microns, that is, only biological samples having a size difference more than 5 microns can be sorted.

SUMMARY

For defects in the prior art, the present disclosure provides a magnetic sorting microfluidic chip and a manufacturing method therefor.

Specifically, the present disclosure provides the following specific embodiments:

An embodiment of the present disclosure provides a magnetic sorting microfluidic chip, including a substrate, a chip model material layer, a micro-channel unit and a magnetic sorting unit, where the chip model material layer is disposed on the substrate, and the micro-channel unit and the magnetic sorting unit are both disposed in the chip model material layer;

the micro-channel unit includes a sorting channel and magnetic pole channels; the sorting channel is provided with a plurality of sorting channel inlets and a plurality of sorting channel outlets; and the magnetic sorting unit includes permanent magnets, high-permeability alloys, and magnetic pole arrays disposed in the magnetic pole channels, where the high-permeability alloys are configured to conduct magnetic fields of the permanent magnets to the magnetic pole arrays, so that the magnetic pole arrays generate two magnetic fields having high intensity, high gradient, and opposite polarities on left and right positions of the same side of the sorting channel, and thus the sorting channel sorts, according to sizes, particles to be processed into different sorting channel outlets.

In one specific embodiment, the magnetic pole channels include a first magnetic pole channel and a second magnetic pole channel which are symmetrically arranged; the first magnetic pole channel is provided with a first magnetic pole channel inlet, and the second magnetic pole channel is provided with a second magnetic pole channel inlet; the first magnetic pole channel and the second magnetic pole channel are provided with a common magnetic pole channel outlet; and the first magnetic pole channel and the second magnetic pole channel are both provided with micro-channel filtration columns; and the magnetic polarities of the magnetic pole arrays inside the first magnetic pole channel and the second magnetic pole channel are opposite.

In one specific embodiment, the sorting channel inlets include a particle inlet and a sheath flow inlet, and the sum of widths of the particle inlet and the sheath flow inlet is identical to a width of the sorting channel.

In one specific embodiment, a range of a width ratio of the particle inlet to the sheath flow inlet is 1:4-1:0.5.

In one specific embodiment, a height range of the micro-channel unit is 10-800 microns;

a width range of the magnetic pole channels is 5-500 microns;

a width range of the sorting channel is 10-1000 microns;

the magnetic pole array is composed of ferromagnetic powder, and having a triangular structure or a semicircular structure;

a distance from a tip of the magnetic pole array to the sorting channel is 1-25 microns;

a particle size range of the ferromagnetic powder is 1-20 microns; and the high-permeability alloys are magnetically soft alloys; and a thickness range of the high-permeability alloy is 10-800 microns.

In one specific embodiment, the substrate is made of glass or a transparent resin material, and the chip model material layer is made of polydimethylsiloxane, glass or a transparent resin material.

An embodiment of the present disclosure further provides a manufacturing method for a magnetic sorting microfluidic chip, including:

manufacturing a microfluidic chip by using an MEMS process and a soft lithography method or by means of printing by a 3D printer, where the microfluidic chip includes a micro-channel unit and a plurality of high-permeability alloy embedding regions, the micro-channel unit includes a sorting channel and magnetic pole channels, the number of the magnetic pole channels is two, the high-permeability alloy embedding regions include a first region, a second region and a third region, the two magnetic pole channels each includes one magnetic pole channel inlet, and the two magnetic pole channels include a common magnetic pole channel outlet;

embedding a third high-permeability alloy in the third region, and fixing a third permanent magnet above the third high-permeability alloy, where a magnetic induction line direction of the third permanent magnet is perpendicular to a plane where the third high-permeability alloy is located;

injecting a solution, obtained by uniformly mixing ferromagnetic powder and pure water, into the two magnetic pole channels through the two magnetic pole channel inlets, so as to preliminarily secure the ferromagnetic powder in a preset magnetic pole array region under effects of the third high-permeability alloy, the third permanent magnet and the filtration column structures in the magnetic pole channels;

injecting liquid PDMS into the two magnetic pole channels through the two magnetic pole channel inlets, enabling the liquid PDMS to pass through the micro-channel filtration column structures, embedding a first high-permeability alloy and a second high-permeability alloy into a first region and a second region, respectively, where distances from the first permanent magnet and the second permanent magnet to the magnetic pole arrays are 5-20 microns, and then curing the liquid PDMS, so that the ferromagnetic powder is completely secured on the preset magnetic pole array region; and removing the third high-permeability alloy and the third permanent magnet from the microfluidic chip, then fixing a first permanent magnet above the first high-permeability alloy, and fixing a second permanent magnet above the second high-permeability alloy, where magnetic induction line directions of the first permanent magnet and the second permanent magnet are both perpendicular to the plane, and directions of magnetic polarities of the first permanent magnet and the second permanent magnet are opposite.

In one specific embodiment, a range of a mass ratio of the ferromagnetic powder to the pure water in the solution is 1:500-1:50, and the solution is uniformly oscillated by a vibrator and an ultrasonic oscillator.

In one specific embodiment, a range of a ratio of a prepolymer to a curing agent in the liquid PDMS is 3:1-12:1, and the liquid PDMS is placed in an oven and baked at a temperature of 80° C. for 0.5-24 hours to be cured.

In one specific embodiment, a volume of the third permanent magnet is greater than or equal to $1\times10^{-6}$ cubic meters, and remanence of the material is greater than or equal to 0.5 Tesla; and a distance from the third permanent magnet to a side wall surface of the sorting channel is 100-200 microns.

Hence, the embodiments of the present disclosure have the following technical effects: the present solution solves the problem of a low negative magnetophoresis sorting resolution, and improves the negative magnetophoresis sorting resolution for biological samples and particles from a micron scale to a submicron scale.

BRIEF DESCRIPTION OF THE DRAWINGS

To describe the technical solutions in the embodiments of the present disclosure more clearly, the following briefly introduces the accompanying drawings required for describing the embodiments. It should be understood that the accompanying drawings show only some embodiments of the present disclosure and are therefore not to be considered as limiting of scope, and a person of ordinary skill in the art may still derive other drawings from these accompanying drawings without creative efforts.

FIG. 5 is a dimension schematic diagram of a structure of a sorting channel in a magnetic sorting microfluidic chip provided by an embodiment of the present disclosure.

FIG. 6 is a schematic flowchart of a manufacturing method for a magnetic sorting microfluidic chip provided by an embodiment of the present disclosure.

DESCRIPTION OF REFERENCE NUMERALS

- 1—first magnetic pole channel inlet; 2—particle inlet; 3—sheathflow inlet; 4—chip model material layer;
- 5—substrate; 6—first high-permeability alloy; 7—first magnetic pole array; 8—third high-permeability alloy embedding region;
- 9—second high-permeability alloy; 10—second magnetic pole array; 11—sorting channel; 12—first sorting channel outlet;
- 13—second sorting channel outlet; 14—third sorting channel outlet; 15—second magnetic pole channel inlet;
- 16—second magnetic pole channel; 17—second permanent magnet; 18—magnetic pole channel outlet; 19—first permanent magnet;
- 20—first magnetic pole channel; 21—magnetic sorting unit; 22—first micro-channel filtration column;
- 23—second micro-channel filtration column; 24—third high-permeability alloy; 25—first high-permeability alloy embedding region;
- 26—second high-permeability alloy embedding region; 27—third permanent magnet.

DETAILED DESCRIPTION

Hereinafter, various embodiments of the present disclosure will be described more comprehensively. The present disclosure includes various embodiments, which can be adjusted and changed. However, it should be understood that there is no intention to limit the embodiments of the present disclosure to the particular embodiments disclosed herein, but the present disclosure should be understood to cover all adjustments, equivalents and/or alternatives that fall within the spirits and scopes of the embodiments of the present disclosure.

The terms used in the embodiments of the present disclosure is for the purpose of describing the particular embodiments only and is not intended to limit the embodiments of the present disclosure. As used herein, the singular forms are also intended to include the plural forms as well, unless the context clearly indicates otherwise. Unless otherwise specified, all terms (including technical and scientific terms) used herein have the same meanings as commonly understood by a person of ordinary skill in the art in the embodiments of the present disclosure. Such terms (as those defined in a generally used dictionary) are to be interpreted to have the meanings the same as the contextual meanings in the relevant technical field, and are not to be interpreted to have ideal or excessively formal meanings unless clearly defined in the embodiments of the present disclosure.

Embodiment 1

Figure 1:
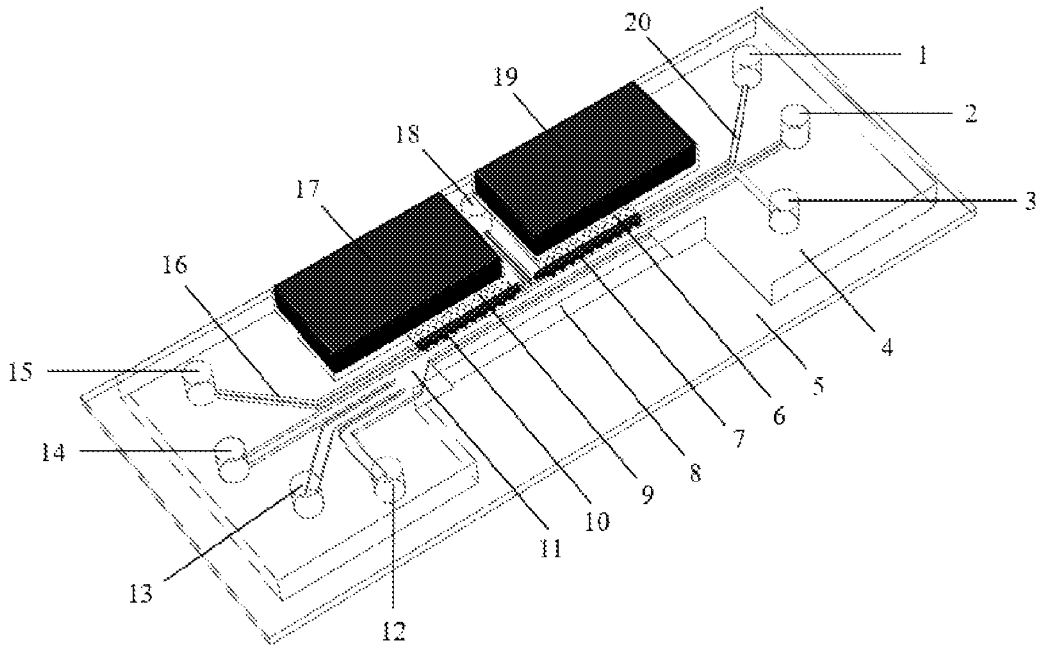
FIG. 1 is an overall structure diagram of a magnetic sorting microfluidic chip provided by an embodiment of the present disclosure.

Embodiment 1 of the present disclosure provides a magnetic sorting microfluidic chip, as shown in FIG. 1 to FIG. 5, including a substrate 5, a chip model material layer 4, a micro-channel unit and a magnetic sorting unit, where the chip model material layer 4 is disposed on the substrate 5, and the micro-channel unit and the magnetic sorting unit are both disposed in the chip model material layer 4;

the micro-channel unit includes a sorting channel 11 and magnetic pole channels (for example, as shown in FIG. 1, including a first magnetic pole channel 20 and a second magnetic pole channel 16); the sorting channel is provided with a plurality of sorting channel inlets and a plurality of sorting channel outlets.

Figure 2:
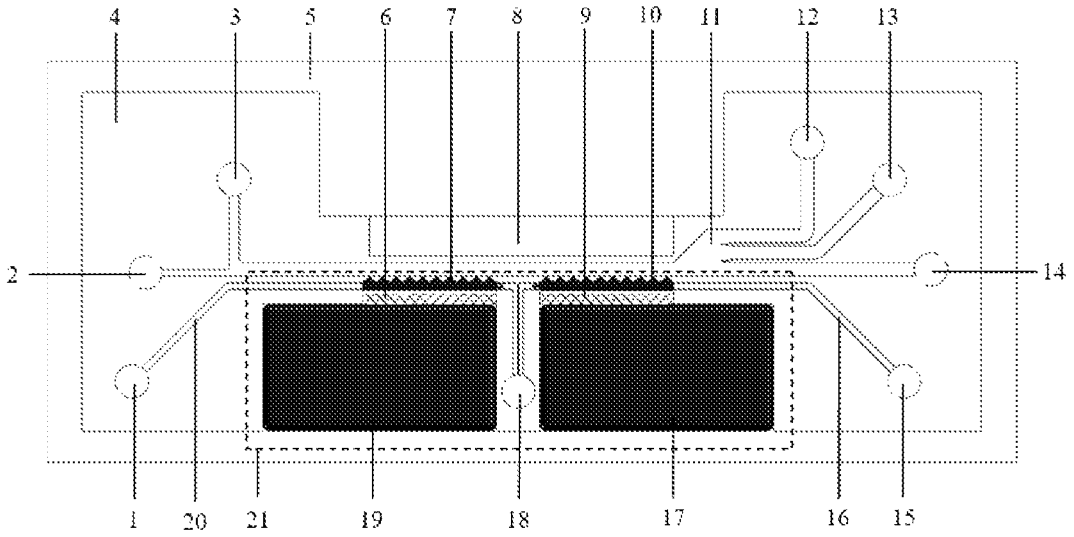
FIG. 2 is a front view of a magnetic sorting microfluidic chip provided by an embodiment of the present disclosure.

Specifically, as shown in FIG. 1 and FIG. 2, the micro-channel unit is composed of two magnetic pole channels and one sorting channel. The magnetic pole channels are used for forming two magnetic pole arrays having opposite magnetic polarities. A magnetic pole array unit in each magnetic pole array is triangular or semicircular, and is configured to provide magnetic force for separation of particles in the sorting channel. A carrier fluid in the sorting channel is magnetic liquid, and is used for sorting non-magnetic particles or cells.

The magnetic sorting unit includes permanent magnets, high-permeability alloys, and magnetic pole arrays disposed in the magnetic pole channels, where the high-permeability alloys are configured to conduct magnetic fields of the permanent magnets to the magnetic pole arrays, so that the magnetic pole arrays generate two magnetic fields having high intensity, high gradient, and opposite polarities on left and right positions of the same side of the sorting channel, and thus the sorting channel sorts, according to sizes, particles to be processed into different sorting channel outlets.

The magnetic sorting unit is composed of the permanent magnets, the high-permeability alloys and the magnetic pole arrays. The magnetic fields of the permanent magnets are conducted to the magnetic pole arrays by the high-permeability alloys, and the magnetized magnetic pole arrays generate magnetic fields having high intensity and high gradient locally in the sorting channel, thereby implementing negative magnetophoresis sorting of biological samples or particles of a submicron scale, or simultaneously implementing magnetophoresis sorting of nanomagnetic particles and negative magnetophoresis sorting of nano non-magnetic particles of a nano scale.

In the magnetic sorting unit, the external permanent magnets provide magnetic fields, the high-permeability alloys conduct the magnetic fields to the magnetic pole arrays, and the magnetized magnetic pole arrays having a particular shape can locally generate magnetic fields having high intensity and high gradient in the micro-channel. The permanent magnets are strong magnets made of a material having remanence greater than or equal to 0.5 Tesla. The materials of the high-permeability alloys are magnetically soft alloys (for example, permalloy, nanocrystalline or silicon steel sheets), and the thickness is 10-800 microns. A ferromagnetic powder material in the magnetic pole arrays is ferrite powder or iron particle powder, and the particle size of the powder is 1-20 microns.

The function of the sorting channel is to sort particles according to sizes. The width of the channel is 10-1000 microns, and the channel includes two channel inlets and two or three channel outlets (as the case of three sorting channel outlets shown in FIG. 1). The channel inlets include a particle inlet 2 and a sheath flow inlet 3, and a width ratio thereof is 1:4-1:0.5. The sum of the widths of the particle inlet 2 and the sheath flow inlet 3 is identical to a width of the sorting channel. Particles or cells of no less than two different sizes are introduced from the particle inlet 2, and the particles or cells are focused by a sheath flow on the side close to the magnetic pole channels, where the focus width is 2-600 microns. Liquid carriers introduced from the particle inlet 2 and the sheath flow inlet 3 are both magnetic solutions (ferrofluids or paramagnetic solutions). When non-magnetic particles or cells in the magnetic solutions pass through the sorting unit, the non-magnetic particles or cells may move away from the magnetic pole arrays due to a repulsive effect of a negative magnetophoretic force. Moreover, an acting force exerted thereon is proportional to its volume, and therefore, a negative magnetophoretic force on large-sized particles is larger, and a lateral displacement produced thereby is larger, while an acting force on small particles is smaller, and a lateral displacement is also smaller. Due to the difference in lateral displacements, the particles or cells of different sizes may enter different sorting channel outlets at the outlets of the sorting channel. FIG. 1 illustrates three sorting channel outlets, capable of sorting particles into three categories according to sizes. The number of channel outlets is the same as the number of size categories of particles to be sorted. When the magnetic particles (the magnetic susceptibility being greater than that of the magnetic solution) and the non-magnetic particles pass through the magnetic sorting unit in a mixed mode, the two types of particles receive magnetic forces from opposite directions. At this time, the magnetic particles may move to the magnetic pole arrays due to a magnetophoretic force effect, and the non-magnetic particles move away from the magnetic pole arrays due to the a negative magnetophoretic force, so that magnetophoresis sorting and negative magnetophoresis sorting are simultaneously implemented in the same micro-channel.

Furthermore, the magnetic pole channels include a first magnetic pole channel and a second magnetic pole channel which are symmetrically arranged; the first magnetic pole channel is provided with a first magnetic pole channel inlet 1, and the second magnetic pole channel is provided with a second magnetic pole channel inlet 15; the first magnetic pole channel and the second magnetic pole channel are provided with a common magnetic pole channel outlet; and the first magnetic pole channel and the second magnetic pole channel are both provided with micro-channel filtration columns; and the magnetic polarities of the magnetic pole arrays inside the first magnetic pole channel and the second magnetic pole channel are opposite.

In addition, the sorting channel inlets include the particle inlet 2 and the sheath flow inlet 3, and the sum of widths of the particle inlet 2 and the sheath flow inlet 3 is identical to a width of the sorting channel.

Furthermore, the range of the width ratio of the particle inlet 2 to the sheath flow inlet 3 is 1:4-1:0.5. Flow rates at both the particle inlet 2 and the sheath flow inlet 3 are equal, and fall within a range of 0.001-0.01 m/s. Widths of the outlets are equal to the width of the sorting channel, and fall within a range of 10-1000 microns.

Furthermore, a height range of the micro-channel unit is 10-800 microns.

A width range of the magnetic pole channels is 5-500 microns, the height is 10-800 microns, and a length is greater than 20 millimeters.

A width range of the sorting channel is 10-1000 microns, and a height is 10-800 microns.

The magnetic pole array is composed of ferromagnetic powder, and having a triangular structure or a semicircular structure. The length of the magnetic pole array inside each magnetic pole channel is 1-10 millimeters, and the magnetic pole arrays are formed by multiple triangular or semicircular structures, where the triangles are equilateral triangles, the width of the base is 10-500 microns, and the height is 10-200 microns. If it is the semicircular structure, a radius of the semicircle is 5-250 microns. A distance from a tip of the triangle or the edge at the top of the semicircle to the side wall of the sorting channel is 1-25 microns. Filtration column structures are provided at rear ends of the magnetic pole arrays in the magnetic pole channels, and a width of a channel allowing passage is 5 microns.

A particle size range of the ferromagnetic powder is 1-20 microns.

The high-permeability alloys are magnetically soft alloys. A thickness range of the high-permeability alloy is 10-800 microns, and the length is identical to the length of the magnetic pole arrays, falling within the range of 1-10 millimeters. A distance from the high-permeability alloys to the magnetically soft alloys is 5-20 microns.

The two permanent magnets in the magnetic sorting unit are arranged to have opposite directions of magnetic fields. Magnetic induction lines are all perpendicular to the high-permeability alloy sheets. The permanent magnets are strong magnets made of a material having remanence greater than or equal to 0.5 Tesla, and a volume of each permanent magnet is greater than or equal to $1\times10^{-6}$ cubic meters. A distance from the permanent magnets to the magnetic pole arrays is 1-2 millimeters.

The substrate 5 is made of glass or a transparent resin material, and the chip model material layer 4 is made of polydimethylsiloxane (i.e., PDMS), glass or a transparent resin material.

Embodiment 2

Embodiment 2 of the present disclosure further discloses a magnetic sorting microfluidic chip. FIG. 1 is an overall structure diagram of the magnetic sorting microfluidic chip, and FIG. 2 is a front view of the magnetic sorting microfluidic chip. In this embodiment, the chip is a three-level sorting chip, a chip model material layer 4 is made of polydimethylsiloxane (PDMS), and a substrate 5 of the chip is a glass substrate.

A micro-channel unit of the chip includes a sorting channel 11, a magnetic pole channel 20, and a second magnetic pole channel 16. The sorting channel 11 includes a particle inlet 2, a sheath flow inlet 3, a first sorting channel outlet 12, a second sorting channel outlet 13, and a third sorting channel outlet 14. A width ratio of the particle inlet 2 to the sheath flow inlet 3 is 1:4-1:0.5, and the sum of widths of the two inlets is identical to a width of the sorting channel 11, falling within a range of 5-1000 microns. The first magnetic pole channel 20 includes a first magnetic pole channel inlet 1 and a first micro-channel filtration column 22. A second magnetic pole channel 16 includes a second magnetic pole channel inlet 15 and a second micro-channel filtration column 23. The two magnetic pole channels are symmetrically arranged, and share one magnetic pole channel outlet 18. The structures of the filtration columns are as shown in FIG. 4.

A magnetic sorting unit 21 of the chip includes a first magnetic pole array 7, a second magnetic pole array 10, a first high-permeability alloy 6, a second high-permeability alloy 9, a first permanent magnet 19 and a second permanent magnet 17, where the permanent magnets provide magnetic fields, the sizes of the two permanent magnets are identical, volume of the magnet is greater than or equal to $1\times10^{-6}$ cubic meters, and the permanent magnets are strong magnets having remanence greater than or equal to 0.5 Tesla. The materials of the high-permeability alloys are magnetically soft alloys (for example, permalloy, nanocrystalline or silicon steel sheets), and the thickness is 10-800 microns. Taking FIG. 2 as an example, a direction of the magnetic field of the first permanent magnet 19 is perpendicular to a paper surface downward, and a direction of the magnetic field of the second permanent magnet 17 is perpendicular to the paper surface upward. The high-permeability alloys are capable of conducting the magnetic fields of the permanent magnets to the magnetic pole arrays made of ferromagnetic powder. The magnetic pole arrays are made of multiple triangles. The magnetized magnetic pole arrays generate magnetic fields having high gradient at tips of the triangles.

Figure 3:
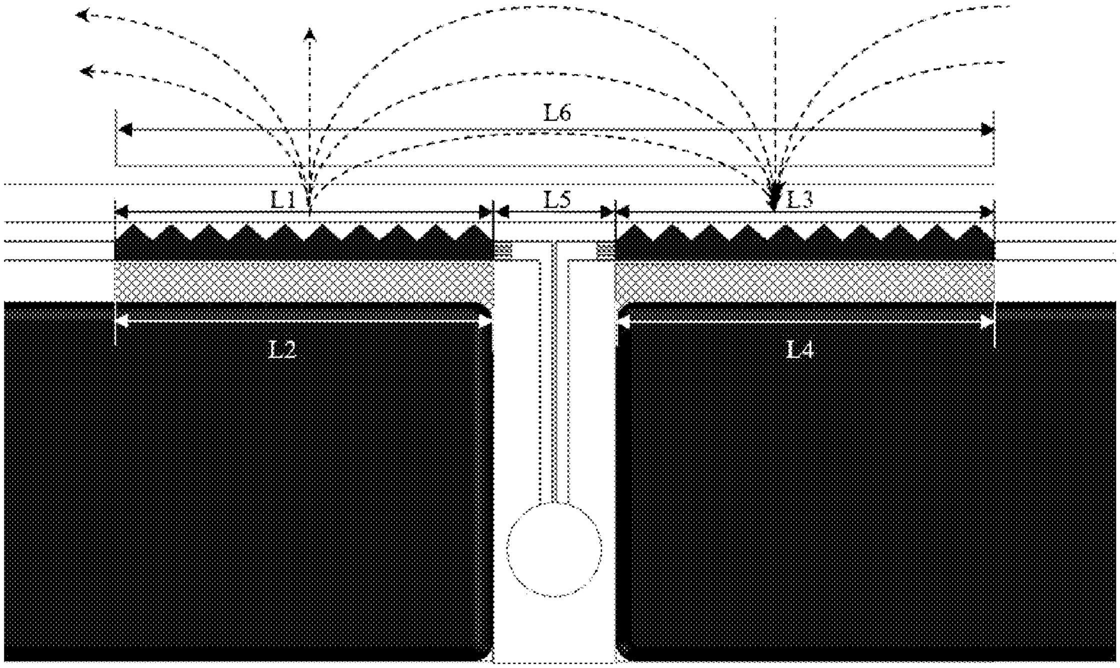
FIG. 3 is a partial enlarged diagram of a magnetic sorting unit in a magnetic sorting microfluidic chip provided by an embodiment of the present disclosure.

FIG. 3 is a partial enlarged diagram of the magnetic sorting unit in FIG. 2, and shows magnetic induction lines between the two magnetic pole arrays. The first magnetic pole array 7 is an N pole and the second magnetic pole array 10 is an S pole. Length ranges (L1) and (L3) of each magnetic pole array are all 1-10 millimeters, and length ranges (L2) and (L4) of the first high-permeability alloy 6 and the second high-permeability alloy 9 are equal to those of magnetic pole arrays, i.e., 1-10 millimeters. A distance (L5) between the two magnetic pole arrays is 1-3 millimeter, and a length of a third high-permeability alloy embedding region 8 is equal to L1+L5+L3.

Figure 4:
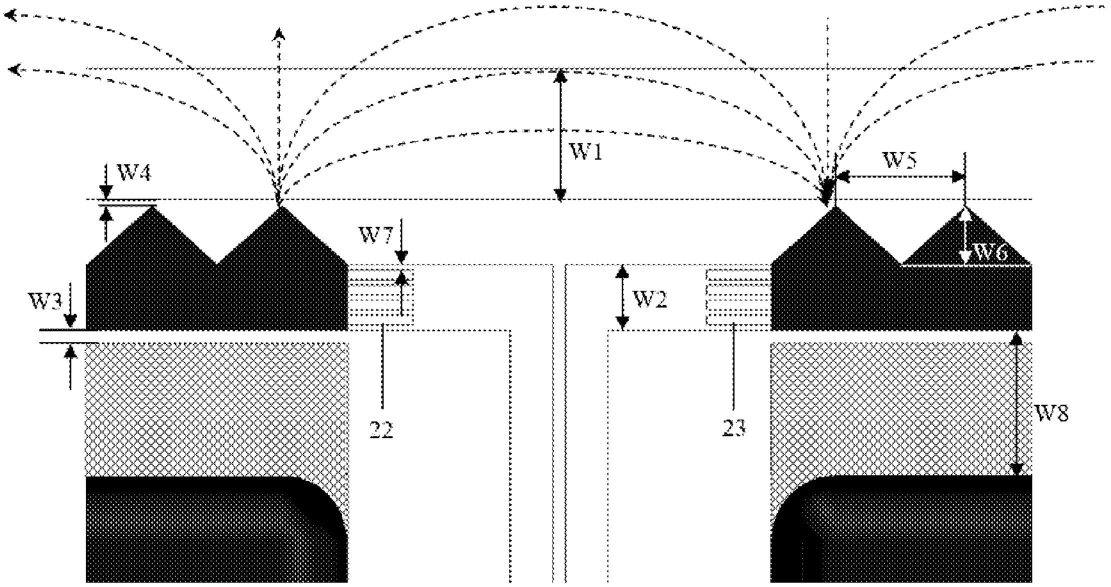
FIG. 4 is a dimension schematic diagram of a structure of a magnetic sorting unit in a magnetic sorting microfluidic chip provided by an embodiment of the present disclosure.

FIG. 4 is a dimension schematic diagram of a structure of the magnetic sorting unit in FIG. 3. Heights of the sorting channel and the magnetic pole channels are identical and fall within a range of 10-800 microns. A width (W1) of the sorting channel is 10-1000 microns, and a length is greater than 20 millimeters. A width (W2) of each magnetic pole channel is 5-500 microns, and a length is greater than 20 millimeters. Distances (W3) from the first high-permeability alloy 6 and the second high-permeability alloy 9 to the magnetic pole arrays are 5-20 microns. A distance (W4) from a tip of the triangle of each magnetic pole array to the side surface of the sorting channel is 1-25 microns. A distance (W5) between tips of two magnetic poles is 10-500 microns, which is the length of the base of the triangle. In the filtration column structures provided in the magnetic pole channels, a width (W7) of a channel allowing passage is 5 microns. Distances (W8) from the first permanent magnet 19 and the second permanent magnet 17 to the magnetic pole arrays are 1-2 millimeters.

FIG. 5 is a dimension schematic diagram of the sorting channel A distance (W11) from the third high-permeability alloy embedding region 8 to the side surface of the sorting channel is 50-100 microns. A width (W9) of each sorting channel outlet is identical to the width (W1) of the sorting channel, i.e., 10-1000 microns. The widths of the three sorting channel outlets are equal, and a distance (W10) between every two outlet channels is 2-100 microns.

During particle or cell sorting, particles or cells of different sizes are uniformly mixed in a magnetic solution, and the concentrations of the particles are all $2\times10^{7}$ per milliliter. In this embodiment, taking particles having diameters of 0.5 microns, 1 micron and 2 microns as an example, the three types of particles are uniformly mixed in a magnetic solution (a ferrofluid or a paramagnetic solution) in equal amounts, then the mixed particle liquid is injected into the sorting channel 11 from the particle inlet 2 at a flow rate of 0.001-0.01 m/s, and simultaneously, a particle-free magnetic solution is injected into the sheath flow inlet 3 at the same flow rate. The particles or cells are focused by a sheath flow on the side close to the magnetic pole channels, where the focus width is 2-600 microns. When passing through the magnetic sorting unit 21, the non-magnetic particles or cells in the magnetic solution may move away from the magnetic pole arrays due to a negative magnetophoretic force effect generated by the magnetic pole arrays. Because the distance from the tip of each magnetic pole array to the sorting channel 11 is within 5 microns, and the magnetic pole arrays can generate a magnetic field having high intensity (≥2.3 Tesla) and high gradient (≥1100 Tesla/m) in this range, a sufficient sorting magnetic force can be exerted on small-sized particles. Moreover, an acting force exerted thereon is proportional to its volume, and therefore, a negative magnetophoretic force on large-sized particles is larger, and a lateral displacement produced thereby is larger, while an acting force on small particles is smaller, and a lateral displacement is also smaller. Due to the difference in lateral displacements, the particles or cells of different sizes may enter different sorting channel outlets at the outlets of the sorting channel FIG. 1 illustrates that 0.5 micron particles enter the third sorting channel outlet 14, 1 micron particles enter the second sorting channel outlet 13, and 2 micron particles enter the first sorting channel outlet 12, so that separation of three types of particles of different sizes is implemented.

When nano magnetic particles (the magnetic susceptibility being greater than that of the magnetic solution, and the diameter is 0.2-1 microns), the non-magnetic particles (the diameter is greater than or equal to 0.5 microns) and the magnetic solution are mixed and then injected from the sheath flow inlet 3, a magnetic solution is injected by taking the particle inlet 2 as the sheath flow inlet, and the mixture passes through the magnetic sorting unit 21, the two types of particles receive magnetic forces from opposite directions. At this time, the magnetic particles may move to the magnetic pole arrays due to a magnetophoretic force, and the non-magnetic particles move away from the magnetic pole arrays due to the a negative magnetophoretic force. In FIG. 1, the 0.5 micron non-magnetic particles may enter the second sorting channel outlet 13 and the first sorting channel outlet 12, and the 0.2-1 micron nano magnetic particles may enter the third sorting channel outlet 14, so that magnetophoresis sorting and negative magnetophoresis sorting are simultaneously implemented in the same micro-channel.

Embodiment 3

Figure 7:
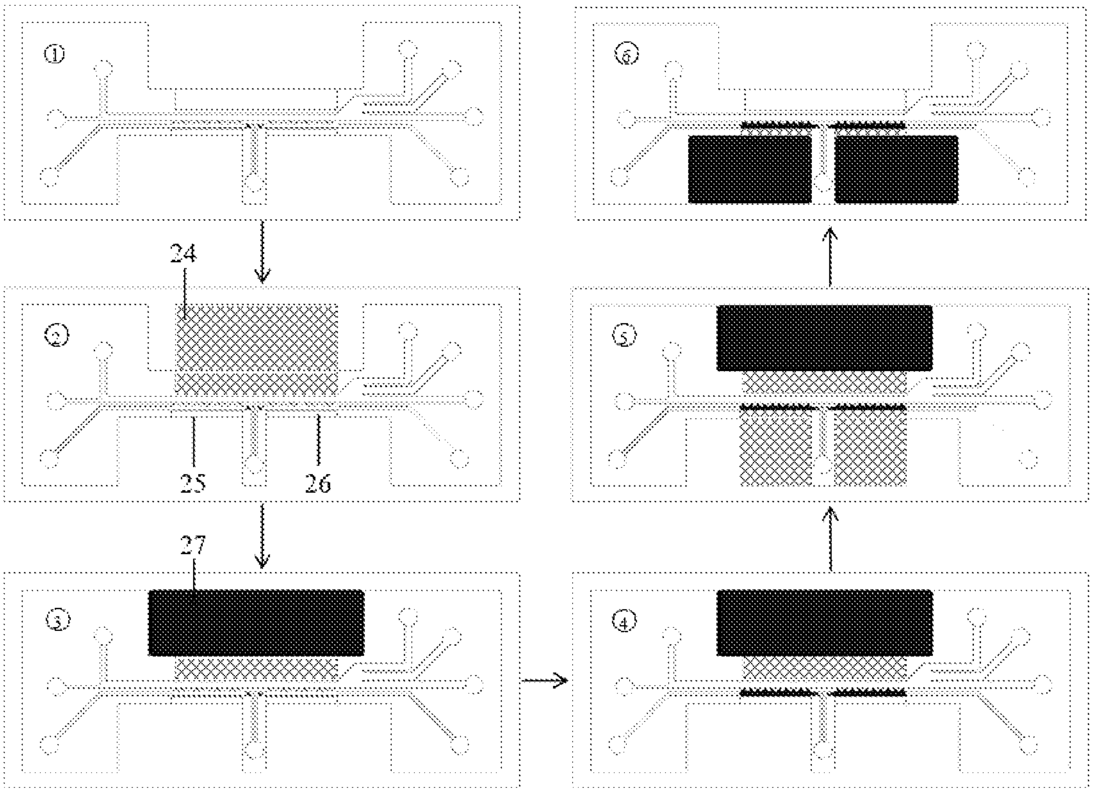
FIG. 7 is a flowchart of a manufacturing method for a magnetic sorting microfluidic chip provided by an embodiment of the present disclosure.

Embodiment 3 of the present disclosure further provides a manufacturing method for a magnetic sorting microfluidic chip, as shown in FIG. 6 and FIG. 7, including:

At step 201, a microfluidic chip is manufactured by using a micro electro mechanical system (MEMS) process and a soft lithography method or by means of printing by a 3D printer, where the microfluidic chip includes a micro-channel unit and a plurality of high-permeability alloy embedding regions, the micro-channel unit includes a sorting channel and magnetic pole channels, the number of the magnetic pole channels is two, the high-permeability alloy embedding regions include a first region, a second region and a third region, the two magnetic pole channels each includes one magnetic pole channel inlet, and the two magnetic pole channels include a common magnetic pole channel outlet.

At step 202, a third high-permeability alloy is embedded in the third region, and a third permanent magnet is fixed above the third high-permeability alloy, where a magnetic induction line direction of the third permanent magnet is perpendicular to a plane where the third high-permeability alloy is located.

At step 203, a solution, obtained by uniformly mixing ferromagnetic powder and pure water, is injected into the two magnetic pole channels through the two magnetic pole channel inlets, so as to preliminarily secure the ferromagnetic powder in a preset magnetic pole array region under effects of the third high-permeability alloy, the third permanent magnet and the filtration column structures in the magnetic pole channels.

At step 204, liquid polydimethylsiloxane (PDMS) is injected into the two magnetic pole channels through the two magnetic pole channel inlets, the liquid PDMS is enabled to pass through the micro-channel filtration column structures, a first high-permeability alloy 6 and a second high-permeability alloy 9 are respectively embedded into a first region and a second region, and then the liquid PDMS is cured, so that the ferromagnetic powder is completely secured on the preset magnetic pole array region, and distances from the first permanent magnet and the second permanent magnet to the magnetic pole arrays are 5-20 microns.

At step 205, the third high-permeability alloy and the third permanent magnet are removed from the microfluidic chip, then a first permanent magnet is fixed above the first high-permeability alloy 6, and a second permanent magnet is fixed above the second high-permeability alloy 9, where magnetic induction line directions of the first permanent magnet and the second permanent magnet are both perpendicular to the plane, and directions of magnetic polarities of the first permanent magnet and the second permanent magnet are opposite.

In one specific embodiment, a range of a mass ratio of the ferromagnetic powder to the pure water in the solution is 1:500-1:50, and the solution is uniformly oscillated by a vibrator and an ultrasonic oscillator.

In one specific embodiment, a range of a ratio of a prepolymer to a curing agent in the liquid PDMS is 3:1-12:1, and the liquid PDMS is placed in an oven and baked at a temperature of 80° C. for 0.5-24 hours to be cured.

In one specific embodiment, a volume of the third permanent magnet is greater than or equal to $1\times10^{-6}$ cubic meters, and remanence of the material is greater than or equal to 0.5 Tesla; and a distance from the third permanent magnet to a side wall surface of the sorting channel is 100-200 microns.

Specifically, FIG. 7 is a flowchart of a manufacturing method for a magnetic sorting microfluidic chip, which can be divided into six steps.

At the first step, a conventional microfluidic chip is manufactured by using a soft lithography method. In this step, a micro-channel unit of the chip is manufactured and includes a first magnetic pole channel 20, a second magnetic pole channel 16 and a sorting channel 11, as well as a first high-permeability alloy embedding region 25, a second high-permeability alloy embedding region 26 and a third high-permeability alloy embedding region 8.

At the second step, a third high-permeability alloy 24 is embedded in the third high-permeability alloy embedding region 8, and a distance from the third high-permeability alloy 24 to a side wall of the sorting channel is 100-200 microns.

At the third step, a third permanent magnet 27 is fixed above the third high-permeability alloy 24. The third permanent magnet 27 is a strong magnet having a volume greater than or equal to $1\times10^{-6}$ cubic meters, and made of a material having remanence greater than or equal to 0.5 Tesla. A direction of the magnetic field is perpendicular to a paper surface downward.

At the fourth step, ferromagnetic powder (the material is ferrite powder or iron particle powder, and a particle size range is 1-20 microns) and pure water are mixed according to a mass ratio of 1:50-1:500 to obtain a mixed liquid, which is vibrated by a vibrator for one minutes, and then oscillated by an ultrasonic oscillator at 60 watts for two minutes. The powder is uniformly dispersed and then injected into the magnetic pole channels from the first magnetic pole channel inlet 1 and the second magnetic pole channel inlet 15. Under the effects of the first micro-channel filtration column 22, a second micro-channel filtration column 23, the first high-permeability alloy 24 and the third permanent magnet 27, the ferromagnetic powder is preliminarily secured in a magnetic pole array region, where the micro-channel filtration columns can block the ferromagnetic powder, and the liquid can flow through normally.

At the fifth step, liquid polydimethylsiloxane (PDMS, a ratio of a prepolymer to a curing agent being 3:1-12:1) is injected into the magnetic pole channels through the first magnetic pole channel inlet 1 and the second magnetic pole channel inlet 15, the liquid PDMS is enabled to pass through the micro-channel filtration column structures, a first high-permeability alloy 6 and a second high-permeability alloy 9 are respectively embedded into the first high-permeability alloy embedding region 25 and the second high-permeability alloy embedding region 26, and then the liquid PDMS is placed in an oven and baked at a temperature of 80° C. for 1-2 hours to be cured, so that the ferromagnetic powder is secured on the magnetic pole array region.

At the sixth step, the third high-permeability alloy 24 and the third permanent magnet 27 are removed. Then fixing a first permanent magnet 19 above the first high-permeability alloy 6, and fixing a second permanent magnet 17 above the second high-permeability alloy 9. For a first permanent magnet 19 and a second permanent magnet 17, magnetic induction of the two permanent magnets are as follows: a direction of a magnetic field of the first permanent magnet 19 is perpendicular to a paper surface upward, and a direction of a magnetic field of the second permanent magnet 17 is perpendicular to the paper surface downward, so that the directions of the magnetic fields generated by the two magnetic pole arrays are opposite, and both are parallel with the bottom of the micro-channel. Therefore, manufacture of a magnetic sorting chip is completed.

At this time, by using the magnetic sorting microfluidic chip in the present solution, the resolution of negative magnetophoresis sorting is improved to a submicron scale, and the resolution of a sorting size difference is improved to 0.5 micron. Meanwhile, the present disclosure can build a magnetic pole array in region 1-25 microns away from a micro-channel, capable of shortening a magnetic action distance between the magnetic pole array and a sample to be sorted to within 25 microns. Moreover, a strong magnetic field generated by the permanent magnet is conducted to the magnetic pole array by means of a magnetically soft alloy, and a sufficiently strong magnetic field intensity and magnetic field intensity gradient can be generated inside the micro-channel, so that the magnetic force on the sample to be sorted is greatly improved. In a negative magnetophoresis mode, two-level sorting and three-level sorting for non-magnetic particles or biological samples having a diameter of 0.5 microns or more can be realized, the resolution of negative magnetophoresis sorting is improved to a submicron scale, and the resolution of a particle sorting size difference is improved to 0.5 micron. That is, particles or cells having a diameter difference of 0.5 microns can be sorted, for example, non-magnetic particles of 0.5 microns and non-magnetic particles of 1 micron are sorted. In the combined mode of magnetophoresis and negative magnetophoresis, the sorting of nano magnetic particles and non-magnetic particles of 0.5 microns and above can be realized. The throughput of the above two sorting modes can reach $10^6$ per hour.

Moreover, in addition to negative magnetophoresis sorting of non-magnetic particles, the present disclosure may also be applied to capture of magnetic particles, for example, capturing biochemical samples which are specifically bound to magnetic beads. Magnetic beads subjected to functional modification can be adsorbed at the surface of the biochemical sample through an antigen-antibody specific binding effect, so that the biochemical samples are magnetized and captured near the magnetic pole arrays, and a liquid carrier in the sorting channel is a non-magnetic liquid.

A person of ordinary skill in the art can understand that the accompanying drawings are only schematic diagrams of preferred implementation scenarios, and modules or processes in the accompanying drawings are not necessarily required to implement the present disclosure.

A person of ordinary skill in the art can understand that modules in a device in an implementation scenario may be distributed in the device in the implementation scenario according to the description of the implementation scenario, or may be located in one or more devices different from the implementation scenario with corresponding changes. The modules of the above implementation scenario may be combined into one module, or may be further split into multiple sub-modules.

The serial numbers the present disclosure are only for the purpose of description but do not represent the preference of the implementation scenarios.

The above are only several specific implementation scenarios of the present disclosure, but the present disclosure is not limited to this. A person of ordinary skill in the art can easily conceive of changes, which shall all fall within the scope of protection of the present disclosure.

The invention claimed is:

1. A magnetic sorting microfluidic chip, comprising:

a substrate, a chip model material layer, a micro-channel unit and a magnetic sorting unit, wherein the chip model material layer is disposed on the substrate, and the micro-channel unit and the magnetic sorting unit are both disposed in the chip model material layer;

the micro-channel unit comprises a sorting channel, and a first magnetic pole channel and a second magnetic pole channel which are symmetrically arranged on a left side and a right side; the first magnetic pole channel includes a first magnetic pole channel inlet and a first micro-channel filtration column; the second magnetic pole channel includes a second magnetic pole channel inlet and a second micro-channel filtration column; the first and second micro-channel filtration columns are configured to block the ferromagnetic powder; the first magnetic pole channel and the second magnetic pole channel are provided and shared with a common magnetic pole channel outlet; the first and second magnetic pole channels are used for forming two magnetic pole arrays having opposite magnetic polarities; and the magnetic polarities of the magnetic pole arrays inside the first magnetic pole channel and the second magnetic pole channel are opposite;

the sorting channel is provided with a plurality of sorting channel inlets and a plurality of sorting channel outlets and is separated from the first magnetic pole channel and the second magnetic pole channel; the sorting channel inlets comprise a particle inlet and a sheath flow inlet;

particles or cells of no less than two different sizes are introduced from the particle inlet, and the particles or cells are focused by a sheath flow on a side close to the first and second magnetic pole channels; liquid carriers introduced from the particle inlet and the sheath flow inlet are both magnetic solutions; and are used for sorting non-magnetic particles or cells;

the magnetic sorting unit comprises a first and a second permanent magnets made of material having remanence greater than or equal to 0.5 Tesla, a first and a second high-permeability alloys, and a first and a second magnetic pole arrays disposed in the first and second magnetic pole channels, wherein the first and second high-permeability alloys are configured to conduct magnetic fields of the first and second permanent magnets to the first and second magnetic pole arrays, so that the magnetic pole arrays generate two magnetic fields having high intensity, high gradient, and opposite polarities on left and right positions of a same side of the sorting channel, and thus the sorting channel sorts, according to sizes, particles to be processed into different sorting channel outlets; and wherein the common magnetic pole channel outlet is disposed in a middle of the first and the second permanent magnets, the first and second magnetic pole channel on the left and right sides.

2. The chip according to claim 1, wherein a width range of the magnetic pole channels is 5-500 microns;

a width range of the sorting channel is 10-1000 microns;

the magnetic pole array is composed of ferromagnetic powder, and having a triangular structure or a semicircular structure;

a particle size range of the ferromagnetic powder is 1-20 microns;

a distance from a tip of the magnetic pole array to the sorting channel is 1-25 microns; and the high-permeability alloys are magnetically soft alloys; and a thickness range of the high-permeability alloy is 10-800 microns.

3. The chip according to claim 1, wherein the substrate is made of glass or a transparent resin material, and the chip model material layer is made of polydimethylsiloxane, glass or a transparent resin material.

4. The chip according to claim 1, wherein magnetic particles and the non-magnetic particles pass through the magnetic sorting unit in a mixed mode, the magnetic particles and the non-magnetic particles receive magnetic forces from opposite directions; the magnetic particles move to the magnetic pole arrays due to a magnetophoretic force effect, and the non-magnetic particles move away from the magnetic pole arrays due to a negative magnetophoretic force, so that magnetophoresis sorting and negative magnetophoresis sorting are simultaneously implemented in the same micro-channel unit.

* * * * *